United States Patent [19]

Poppe et al.

[11] Patent Number: 4,495,328

[45] Date of Patent: Jan. 22, 1985

[54] CRYSTALLINE COPOLYAMIDES FROM TEREPHTHALIC ACID AND HEXAMETHYLENEDIAMINE AND TRIMETHYLHEXAMETHYLENEDIAMINE

[75] Inventors: Wassily Poppe, Lombard; Yu-Tsai Chen, Glen Ellyn; Larry W. Autry, Lisle, all of Ill.

[73] Assignee: Standard Oil Company (Indiana), Chicago, Ill.

[21] Appl. No.: 601,909

[22] Filed: Apr. 19, 1984

Related U.S. Application Data

[63] Continuation-in-part of Ser. No. 466,903, Feb. 16, 1983, abandoned.

[51] Int. Cl.$^3$ .............................................. C08G 69/26
[52] U.S. Cl. ..................................... 524/606; 524/607; 528/338; 528/339; 528/340; 528/347; 528/349
[58] Field of Search ............... 528/349, 338, 339, 340, 528/347; 524/606, 607

[56] References Cited

U.S. PATENT DOCUMENTS 3,846,379  11/1974  Schneider et al. .................. 528/340
4,250,297   2/1981  Nielinger et al. ................... 528/340

*Primary Examiner*—Harold D. Anderson
*Attorney, Agent, or Firm*—Gunar J. Blumberg; William T. McClain; William H. Magidson

[57] ABSTRACT

Crystalline copolyamides from terephthalic acid and mixtures of hexamethylenediamine and trimethylhexamethylenediamine and filled molding compositions prepared therefrom are disclosed. The injection moldable crystalline copolyamides in molded form are useful in engineering resin applications such as the hood of an automobile, a shroud for a lawn mower, chain saw guard, etc.

21 Claims, No Drawings

CRYSTALLINE COPOLYAMIDES FROM TEREPHTHALIC ACID AND HEXAMETHYLENEDIAMINE AND TRIMETHYLHEXAMETHYLENEDIAMINE

This is a continuation-in-part application of Ser. No. 466,903 filed Feb. 16, 1983, now abandoned.

BACKGROUND OF THE INVENTION

1. Field of the Invention

The field of this invention relates to crystalline copolyamides from terephthalic acid and mixtures of hexamethylenediamine and trimethylhexamethylenediamine.

2. Background

Crystalline copolyamides from terephthalic acid and mixtures of hexamethylenediamine and trimethylhexamethylenediamine have not been obtained in the prior art. In fact, U.S. Pat. No. 3,382,216 teaches that the preparation of polyhexamethylene terephthalamide cannot be effected through melt condensation processes. U.S. Pat. No. 3,150,117 discloses that linear amorphous film forming polyamides can be prepared from dicarboxylic acids and alkyl-substituted saturated hydrocarbons such as trimethylhexamethylenediamine; hexamethylenediamine is not disclosed in this reference. Other pertinent references include U.S. Pat. No. 3,294,758, which discloses that compositions containing greater than 30 percent hexamethylenediamine are brittle. U.S. Pat. Nos. 3,825,516; 3,962,400; 3,294,758; 2,846,379 and 4,250,297 disclose amorphous polyamides. In reviewing all these references, it is clear that the crystalline polyterephthalamides manufactured from terephthalic acid and mixtures of hexamethylenediamine and trimethylhexamethylenediamine including filled compositions of these polymers having a heat deflection temperature of about 240° to about 305° C. are unknown in the prior art.

The general object of this invention is to provide crystalline polyterephthalamides and molding compositions reinforced with glass fibers, glass beads, minerals, graphite fibers or a mixture thereof. We have now found that crystalline polyterephthalamides can be obtained from terephthalic acid (TA) and a mixture of hexamethylenediamine (HMDA) and trimethylhexamethylenediamine (TMHMDA). The mole ratio of HMDA and TMHMDA can vary from about 55/45 to about 98/2, preferably about 60/40 to about 95/5. This crystalline polymer, when filled and molded with glass fibers, glass beads, minerals, graphite fibers or a mixture thereof, usually has a heat deflection temperature of at least about 240° C. to about 305° C., as determined by ASTM method D648. This is an unusual feature and completely unexpected, since amorphous polyterephthalamides have much lower heat deflection temperatures. The importance of having high heat deflection temperatures is that it enables the injection molded polyterephthalamides to be used in applications such as the hood of an automobile, shroud for a lawn mower, chain saw guard, and electrical connector applications. Our molded compositions have good mechanical properties such as tensile strength, flexural properties and impact strength.

The molecular weight of our copolyamides is about 5,000 to about 40,000. Our novel composition can be filled with about 10 to about 60 weight percent glass fibers, glass beads, minerals, graphite fibers, or a mixture thereof. Advantageously, the molding composition may contain from about 20 to about 50 weight percent of glass fibers, glass beads, minerals, graphite fibers, or a mixture thereof. Our studies have shown that high heat deflection temperatures are obtained and the cost of molding products derived from polyterephthalamides are reduced by substituting for part of the polymer about 20 to about 50 weight percent thereof with glass fibers, glass beads, minerals, or graphite fibers. These glass filled polyamides and copolyamides are much more economical than molding compositions prepared without the use of the glass fibers, glass beads, minerals, or graphite fibers. Novel fibers can also be prepared from the polyamide and copolyamide derived from polyterephthalamide and this is indicated by the excellent physical properties of these polyamides.

Our novel crystalline polyterephthalamides are suitably extruded at a temperature of about 300° to about 350° C. through a fiber die having a multiplicity of apertures of about 0.06 inch diameter each. Fiber strands are suitably taken up at about 10 to about 1200 meters per minute, preferably at about 500 to about 1000 meters per minute. The fibers are suitably taken at a temperature of at least about 300° C., advantageously, in the range of about 320° to about 350° C., preferably, in the temperature range of about 330° to about 340° C. to give fibers having a tenacity of about 5 grams per denier and an initial modulus of about 25 grams per denier. The use of polyimides and amides as engineering plastics has been limited only by their relatively high cost. Thus, employing our invention, through which the inherent cost can be brought down, the commercial application of polyamides requiring very high heat deflection temperatures can be greatly expanded.

We have prepared monofilaments using our novel polyamide. With monofilament, the process starts with a single screw extruder to supply a melt for conversion to fiber. The die for monofilament is similar to the multifilament die. The monofilament is a slower operation process, typically about 50 to about 200 feet/minute. For the melt spinning operations about 40 to about 80 feet/minute were used for the monofilament processing. The monofilament, on the other hand, is water quenched with much less melt draw down. The monofilament is subsequently drawn with heated drawing systems. The monofilament drawing is done in-line using heated ovens.

TABLE 1

| Copolyamide Monofilament | | | | |
|---|---|---|---|---|
| Sample TA/HMDA/TMHMDA | $T_m$ (°C.) | Melt Temp (°C.) | Denier (g/9000m) | Elongation (%) |
| 100-50/50 | | | 707 | 25.5 |
| 100-60/40 | 310 | ~330 | 613 | 10.1 |
| Sample TA/HMDA/TMHMDA | Tenacity (g/d) | | Initial Modulus (g/d) | Draw Ratio (X:1.0) |
| 100-50/50 | 3.3 | | 46.8 | |
| 100-60/40 | 5.4 | | 65.2 | 4.5 |

Suitably, in our process for the manufacture of polyterephthalamides, the reaction temperature is kept in the range of about 260° to about 315° C. and HMDA and TMHMDA, in the mole ratio of about 55/45 to about 95/5, preferably in the mole ratio of about 60/40 to about 90/10, are reacted without the addition of any external solvent. The reactant melt temperature in our process is kept in the range of about 250° to about 270° C. In the preferred process, the reaction is conducted in a Helicone reactor, preheated to a temperature of about 90° to about 150° C. In our process for the manufacture of polyamides, about equal molar amounts of TA are reacted with a primary aliphatic diamine, such as HMDA and TMHMDA. The molar ratio of TA to the aliphatic primary diamine may be in the range of about 1.2:1 to about 1:1.2, preferably in the range of about 1:1.

Our novel injection moldable crystalline polyamide copolymer of HMDA and TMHMDA comprises the following recurring structural units:

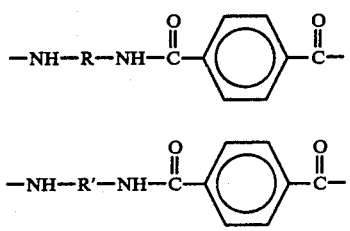

(A)

(B)

wherein R is a straight chain aliphatic hydrocarbon radical containing 6 carbon atoms and R' is an alkyl-substituted saturated hydrocarbon chain, 6 carbon atoms in length in which the alkyl substitution comprises 3 methyl groups with two of the three methyl groups on the same carbon atom. The preferred alkyl-substituted diamines for our novel compositions are 2,2,4-trimethylhexamethylenediamine and 2,4,4-trimethylhexamethylenediamine or mixtures of these. Injection molding of our polyterephthalamide, filled or unfilled, is accomplished by injecting the polyamide into a mold maintained at a temperature of about 100° to about 200° C. In this process, a 20 second to 1 minute cycle is used with a barrel temperature of about 300° to about 350° C. These temperatures will vary depending on the glass transition temperature (Tg) and melt temperature (Tm) of the polyamide being molded. The Tg and Tm of our polyterephthalamide are about 120° to about 160° C. and about 300° to about 340° C., respectively. The polyterephthalamide has excellent thermal and mechanical properties and can readily be molded into useful products or formed into fibers, laminates or coatings. The physical properties of the claimed polyamide are disclosed in Table 3. The Tg of this polyamide is 149° C. and the Tm is about 315° to about 320° C.

We have found that the polyterephthalamide of this invention is improved by the addition of reinforcing materials; particularly, the thermal properties are improved if the polyterephthalamide contains from about 10 to about 60 percent by weight glass fibers, glass beads, minerals, graphite fibers, or mixtures thereof. In the preferred range, the polyterephthalamides contain about 20 to about 50 percent by weight of the glass fibers, glass beads, minerals, graphite fibers, or mixtures thereof. Suitably, the reinforcing materials can be glass fibers, glass beads, glass spheres, or glass fabrics. The glass fibers are made of alkali-free boron-silicate glass or alkali-containing C-glass. The thickness of the fibers is suitably on the average between 3 microns and 30 microns. It is possible to use both long fibers in the range of from 5 to 50 mm and also short fibers with each filament length of 0.05 to 5 mm. In principle, any standard commercial grade fibers, especially glass fibers, may be used. Glass beads ranging from 5 microns to 50 microns in diameter may also be used as a reinforcing material.

The reinforced polyamide polymers may be prepared in various ways. For example, so-called roving, endless glass fiber strands, are coated with the polyamide melt and subsequently granulated. The cut fibers or the glass beads may also be mixed with granulated polyamide and the resulting mixture melted in a conventional extruder, or, alternatively, the fibers may be directly introduced into the polyamide melt through a suitable inlet in the extruder. Injection molding of the novel glass filled polyamide is achieved by injecting the polyamide into a mold maintained at a temperature of about 100° to about 200° C. In this process, a 40 second cycle is used with a barrel temperature of about 300° to about 350° C. The injection molding conditions are given in Table 2.

TABLE 2

| | |
|---|---|
| Mold Temperature | 100° to 200° C. |
| Injection Pressure | 6,000 to 15,000 psi and held for 10 to 20 seconds |
| Back Pressure | 100 to 1,000 psi |
| Cycle Time | 20 to 60 seconds |
| Extruder: Nozzle Temperature | 320° to 340° C. |
| Barrels: Front Heated to | 300° to 350° C. |
| Screw: | 20 to 60 revolutions/minute |

Catalyst can suitably be employed in our process. These catalysts include the following compounds: $NaH_2PO_2$, $H_3PO_2$, $H_3PO_4$, $H_2SO_4$, HCl, $Na_3PO_3$, $NaH_2PO_4 \cdot H_2O$. The amount of catalyst present can vary from about 0.01 to about 0.2 weight percent of the total weight of the reactants. The preferred catalyst is sodium hypophosphite.

The following example illustrates the preferred embodiment of this invention. It will be understood that the examples are for illustrative purposes only and do not purport to be wholly definitive with respect to the conditions or scope of the invention.

EXAMPLE 1

In all the examples, the reactants, 1.317 lbs. TA, 0.614 lbs. HMDA, 0.462 lbs. TMHMDA, and 0.87 gm of sodium hypophosphite, are loaded into a Helicone reactor that has been heated to 95°–150° C. The temperature control is set at 215° C. The agitator is set at the maximum, 36 rpm. In the examples given in Table 2, the reactor pressure rose to 105 psi. The melt temperature was 205° C. The temperature controller settings were gradually increased to 230° C. The reactor pressure rose to 123 psi. The melt temperature was 220° C. The temperature control was then increased to 315° C. The reactor pressure was controlled at 123–125 psi for 16 minutes as melt temperature increased to 260° C. The reactor pressure was then vented down to 100 psi over a 17-minute period. The melt temperature increased to about 310° C. The reactor was then vented to atmospheric pressure over a 2-minute period. The melt temperature reached 313° C. The reaction was then stopped by dumping the resin into water. The resin had an I.V. of 0.86 dl/g, measured in 60/40 phenol/tetrachloroethane at a temperature of 30° C. The filled molding compositions of this invention are prepared by blending the fillers and polymer and then extrusion compounding on an extruder. The extrusion compounding is carried out with the polymer in the molten state, generally at a temperature ranging from about 288° to 355° C., and preferably from about 310° to 343° C.

Injection molding techniques which are used according to this invention are known to persons of skill in the art and are commonly referred to as "reciprocating screw injection molding." In reciprocating screw injection molding, powdered or pelletized polymer is delivered to a hopper and from there fed into the feed port of a barrel, typically cylindrical, which houses a screw adapted for rotation and reciprocal motion within the barrel along the length thereof.

The barrel also has a nozzle end opposite the feed end, and may have a chamber located near the nozzle end. Polymer fed from the hopper into the barrel passes into and through the area between flights of the rotating screw and, during such passage, is plasticated due to heat and the working of the polymer between the interior surface of the barrel and the surfaces between screw flights. Working of the polymer between screw flights and the interior of the barrel compacts the polymer between screw flights. After passing between the screw flights, the compacted, plasticated polymer accumulates in the barrel or in a chamber near the nozzle.

During rotation of the screw, pressure, commonly referred to as "back pressure", is applied to the end of the screw at the feed end of the barrel. An opposing pressure develops due to accumulation of polymer at the nozzle end of the barrel, and when this pressure exceeds the back pressure, the screw is pushed away from the nozzle. When the accumulating polymer fills the chamber or the portion of the barrel vacated by the screw or, in some instances, when the screw reaches a predetermined position, pressure, commonly referred to as "injection pressure", is applied to the screw and the accumulated polymer is forced through the nozzle into a mold, which is commonly heated. In some cases, a booster is used to aid the injection. Typically, a non-return check valve is employed to prevent polymer from flowing back towards the screw. Following injection of the polymer into the mold, the polymer is held therein, the mold is cooled, and the molded part removed.

EXAMPLE 2

The polymer of Example 2 is prepared by dry blending 45 percent by weight of glass fibers with the polyamide prepared in Example 1.

EXAMPLE 3

The polymer of Example 3 is prepared by dry blending 55 percent by weight of glass fibers with the polyamide prepared in Example 1.

TABLE 3

Material Properties of Polyamide From 100% TA In Acid Content And HMDA and TMHMDA

| Example Number | Glass Fiber % | Tensile ASTM Method D-638 | |
|---|---|---|---|
| | | Strength M psi | Elongation % |
| A. | 100/65/35 TA/HMDA/TMHMDA Polyamide (0.86 I.V.) by mole prepared as shown in Example 1. | | |
| 1 | 0 | 13.1 | 5.2 |
| 2 | 45 | 33.6 | 5.3 |
| 3 | 55 | 34.2 | 4.9 |

| Example | Flexural ASTM D-638 | | Notched Izod ASTM D-256 |
|---|---|---|---|
| | Strength | Modulus | |

TABLE 3-continued

Material Properties of Polyamide From 100% TA In Acid Content And HMDA and TMHMDA

| Number | M psi | MM psi | ft-lb/in |
|---|---|---|---|
| 1 | 21.3 | 0.46 | 0.77 |
| 2 | 49.5 | 1.82 | 3.17 |
| 3 | 52.4 | 2.32 | 3.88 |

| Example Number | Tensile Impact ASTM D-256 ft-lb/in$^2$ | HDT ASTM D-668 (at 264 psi) °C. | % Water Absorption ASTM D-570 |
|---|---|---|---|
| 1 | 37 | 103 | 0.55 |
| 2 | 33 | 303 | 0.23 |
| 3 | 88 | >304 | 0.20 |

GENERAL PROCEDURE

The salt is prepared as follows: diacid and diamine monomers are charged to a batch reactor, which has a pitched blade turbine and is of suitable temperature and pressure ratings, to provide a homogeneous salt solution. This is typically about 425° to about 450° F. and about 450 to about 550 psig. Additional components including water, catalyst, silicone oil, end capping agent, and plasticizer are also introduced into the salt reactor. Water content of the salt can range to about 25% by weight. The preferred range is about 13 to about 17% by weight.

The salt is metered through a pump and pressure is increased to about 1500–5000 psig. The resulting prepolymer then passes through a preheat zone where temperature is raised from about 425° to about 450° F. to about 550° to about 625° F. The total residence time here is about 25 to about 50 seconds. The resulting prepolymer is then flashed through a control valve to give an aerosol mist at pressures of about 0–400 psig and the polymer is then passed through a tubular flash reactor. This reactor is designed to provide a high heat flux to the polymer and has a wall temperature of about 650° to about 1000° F. Melt temperature range is about 500° to about 750° F. through the flash reactor. The total residence time in the reactor is about 0.1 to about 20 seconds based on feed rate and pressure. (The inherent viscosity (I.V.) is measured in 60/40 solution of phenol/tetrachloroethane at 30° C.)

Conveniently, the polymer is injected directly on the screws of the twin-screw reactor denoted as ZSK in Examples 4 and 5 to further increase the molecular weight. Examples 4 and 5 were prepared as described in the General Procedure with specific details hereinbelow:

EXAMPLE 4

| | |
|---|---|
| Monomers: | 65% hexamethylene diammonium terephthalate |
| | 35% trimethylhexamethylene diammonium terephthalate |
| Water Content: | 20% (by weight) |
| Specific Mass Flow | 145 lb/hr-in$^2$ |
| Residence time: | Salt reactor 100 minutes |
| | Preheat zone 40 seconds |
| | Reactor zone 2 seconds (est.) |
| Reactor Wall Temp.: | 700° to 765° F. |
| | Pressure: 70–80 psig |
| Melt Temp.: | 635° to 650° F. |
| Salt Feed Temp.: | 615° to 645° F. |
| Product I.V.: | (Phenol/TCE) Tube: 0.20 dl/g |

EXAMPLE 5

| Monomers: | 60% hexamthylene diammonium terephthalate |
| --- | --- |
| | 40% trimethylhexamethylene diammonium terephthalate |
| Water Content: | 17% (by weight) |
| Specific Mass Flow | 140 lb/hr-in$^2$ |
| Residence time: | Salt reactor 100 minutes |
| | Preheat zone 40 seconds |
| | Reactor zone 2 seconds (est.) |
| Reactor Wall Temp.: | 700° F. Pressure: 90-100 psig |
| Melt Temp.: | 640° to 650° F. |
| Salt Feed Temp.: | 640° to 675° F. |
| Product I.V.: | (Phenol/TCE) Tube: 0.20 dl/g |
| | ZSK: 0.83 dl/g |

We claim:

1. A crystalline injection moldable polyamide copolymer of terephthalic acid and hexamethylenediamine and trimethylhexamethylenediamine which copolymer has a heat deflection temperature of at least about 240° C. when molded and filled with glass fibers, glass beads or graphite fibers, comprising the following recurring structural units:

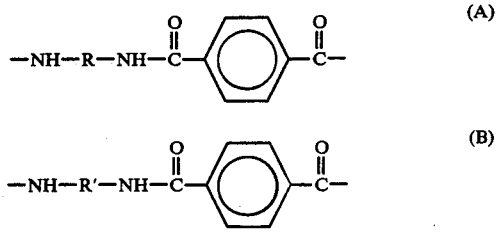

wherein R is a straight chain aliphatic hydrocarbon radical containing 6 carbon atoms and R' is a tri-methyl substituted saturated hydrocarbon radical 6 carbon atoms in length with two of three methyl groups on the same carbon atom wherein the ratio of A units to B units is about 55:45 to about 95:5.

2. The polyamide copolymer as claimed in claim 1 wherein R is hexamethylene and R' is 2,2,4-trimethylhexamethylene, 2,4,4-trimethylhexamethylene or a mixture of both.

3. The polyamide copolymer as claimed in claim 2 having a mole ratio of hexamethylene to trimethylhexamethylene moieties of about 60 to about 40 to about 90 to about 10.

4. A molded object of the polyamide copolymer of claim 1.

5. A molded object of the polyamide copolymer of claim 2.

6. A molded object of the polyamide copolymer of claim 3.

7. A fiber composition of claim 1.

8. A fiber composition of claim 2.

9. A fiber composition of claim 3.

10. A laminate of the polyamide copolymer of claim 1.

11. A laminate of the polyamide copolymer of claim 2.

12. A laminate of the polyamide copolymer of claim 3.

13. A filled injection molded crystalline polyamide molding composition of terephthalic acid and hexamethylenediamine and trimethylhexamethylenediamine comprising about 10 to about 60 percent by weight of glass fibers, glass beads, mineral fibers or a mixture of these and having a heat deflection temperature in excess of 240° C. and comprising the following recurring structural units:

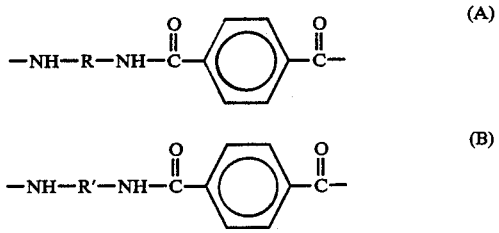

wherein R is a straight chain aliphatic hydrocarbon radical containing 6 carbon atoms and R' is a tri-methyl substituted saturated hydrocarbon radical 6 carbon atoms in length with two of three methyl groups on the same carbon atom wherein the ratio of A units to B units is about 55:45 to about 95:5.

14. The filled injection molded polyamide copolymer composition as claimed in claim 13 wherein R is hexamethylene and R' is 2,2,4-trimethylhexamethylene, 2,4,4-trimethylhexamethylene or a mixture of both.

15. The filled injection molded polyamide copolymer composition as claimed in claim 14 having a mole ratio of hexamethylene to trimethylhexamethylene moieties of about 60 to about 40 to about 90 to about 10.

16. The filled injection molded polyamide copolymer composition of claim 13 which comprises about 20 to about 50 percent of glass fibers, glass beads, mineral fibers or a mixture of these.

17. The filled injection molded polyamide copolymer composition of claim 13 which comprises about 40 to about 60 percent of glass fibers, glass beads, mineral fibers or a mixture of these.

18. The filled injection molded polyamide copolymer composition of claim 14 which comprises about 20 to about 50 percent of glass fibers, glass beads, mineral fibers or a mixture of these.

19. The filled injection molded polyamide composition of claim 15 which comprises about 20 to about 50 percent of glass fibers, glass beads, mineral fibers or a mixture of these.

20. The filled injection molded polyamide composition of claim 14 which comprises about 40 to about 60 percent of glass fibers, glass beads, mineral fibers or a mixture of these.

21. The filled injection molded polyamide composition of claim 15 which comprises about 40 to about 60 percent of glass fibers, glass beads, mineral fibers or a mixture of these.

* * * * *